(12) United States Patent  
Eisenfeld et al.

(10) Patent No.: US 12,111,479 B2
(45) Date of Patent: Oct. 8, 2024

(54) IMAGE DISPLAY SYSTEM WITH BEAM MULTIPLICATION

(71) Applicant: Lumus Ltd., Ness Ziona (IL)

(72) Inventors: Tsion Eisenfeld, Ashkelon (IL); Ronen Chriki, Lod (IL)

(73) Assignee: LUMUS LTD., Ness Ziona (IL)

( * ) Notice: Subject to any disclaimer, the term of this patent is extended or adjusted under 35 U.S.C. 154(b) by 716 days.

(21) Appl. No.: 17/414,403

(22) PCT Filed: Sep. 15, 2020

(86) PCT No.: PCT/IL2020/051008
§ 371 (c)(1),
(2) Date: Jun. 16, 2021

(87) PCT Pub. No.: WO2021/053665
PCT Pub. Date: Mar. 25, 2021

(65) Prior Publication Data
US 2022/0057643 A1  Feb. 24, 2022

Related U.S. Application Data

(60) Provisional application No. 62/900,671, filed on Sep. 16, 2019.

(51) Int. Cl.
*G02B 27/14* (2006.01)
*G02B 27/01* (2006.01)

(52) U.S. Cl.
CPC ......... *G02B 27/14* (2013.01); *G02B 27/0172* (2013.01); *G02B 2027/0125* (2013.01)

(58) Field of Classification Search
CPC ............... G02B 27/14; G02B 27/0172; G02B 2027/0125; G02B 27/0081
See application file for complete search history.

(56) References Cited

U.S. PATENT DOCUMENTS 4,720,189 A  1/1988  Heynen et al.
5,208,800 A  5/1993  Isobe et al.
(Continued)

FOREIGN PATENT DOCUMENTS

CN  101738659 A  6/2010
CN  103837988    6/2014
(Continued)

OTHER PUBLICATIONS

S.Chattopadhyay el al: "Anti-reflecting and pholonic nanostructures", Materials Science and Engineering: R: Repots, ol. 69, No. 1-3, Jun. 20, 2010, pp. 1-35.
(Continued)

*Primary Examiner* — Cara E Rakowski
*Assistant Examiner* — Jennifer A Jones
(74) *Attorney, Agent, or Firm* — Rivka Friedman (57) ABSTRACT

An optical system for displaying an image includes a light-guide optical element (LOE) having a coupling-in region and a propagation region, a coupling-out configuration associated with the propagation region of the LOE, an image projector for generating image illumination corresponding to a collimated image, and a beam-multiplication configuration external to the LOE. The beam-multiplier is a transparent plate bonded to the LOE adjacent to the coupling-in region. The transparent plate has a partially-reflective surface between the LOE and the plate, and a reflector at the opposite surface. The partially-reflective surface and the reflector multiply the beam from the projector so as to fully illuminate the propagation region of the LOE with both the collimated image and a conjugate of the collimated image.

20 Claims, 11 Drawing Sheets

(56) References Cited

U.S. PATENT DOCUMENTS

| | | | |
|---|---|---|---|
| 5,235,589 A | 8/1993 | Yokomori et al. | |
| 5,341,230 A | 8/1994 | Smith | |
| 6,264,328 B1 | 7/2001 | Williams | |
| 6,805,490 B2 | 10/2004 | Levola | |
| 6,927,694 B1 | 9/2005 | Smith et al. | |
| 7,457,040 B2 | 11/2008 | Amitai | |
| 7,570,859 B1 | 8/2009 | DeJong | |
| 7,589,901 B2 | 9/2009 | DeJong et al. | |
| 7,613,373 B1 | 11/2009 | DeJong | |
| 7,653,268 B1 | 1/2010 | DeJong | |
| 7,724,441 B2 | 5/2010 | Amitai | |
| 7,839,575 B2 | 11/2010 | DeJong et al. | |
| 7,949,214 B2 | 5/2011 | DeJong | |
| 8,369,019 B2 | 2/2013 | Baker et al. | |
| 8,391,668 B2 | 3/2013 | Dejong | |
| 8,432,614 B2 | 4/2013 | Amitai | |
| 8,472,119 B1 | 6/2013 | Kelly | |
| 8,531,773 B2 | 9/2013 | DeJong | |
| 8,649,099 B2 | 2/2014 | Schultz et al. | |
| 9,784,985 B2 | 10/2017 | Poon | |
| 9,798,061 B2 | 10/2017 | Hsiao et al. | |
| 10,133,070 B2 | 11/2018 | Danziger | |
| 10,317,679 B2 | 6/2019 | Ayres et al. | |
| 10,437,068 B2 | 10/2019 | Weng et al. | |
| 10,558,044 B2 | 2/2020 | Pan | |
| 10,571,699 B1* | 2/2020 | Parsons | G02B 6/0028 |
| 10,732,461 B2 | 8/2020 | Yoshida | |
| 11,054,581 B2 | 7/2021 | Ayres et al. | |
| 11,187,902 B2 | 11/2021 | Urness et al. | |
| 11,262,564 B2* | 3/2022 | Tanaka | G02B 27/0172 |
| 2007/0070859 A1 | 3/2007 | Hirayama | |
| 2007/0165192 A1 | 7/2007 | Prior | |
| 2009/0122414 A1 | 5/2009 | Amitai | |
| 2010/0027289 A1 | 2/2010 | Aiki et al. | |
| 2010/0220295 A1 | 9/2010 | Mukawa et al. | |
| 2010/0278480 A1 | 11/2010 | Vasylyev | |
| 2010/0291489 A1 | 11/2010 | Moskovits et al. | |
| 2011/0176218 A1 | 7/2011 | Noui | |
| 2012/0044572 A1 | 2/2012 | Simmonds et al. | |
| 2012/0081789 A1 | 4/2012 | Mukawa | |
| 2013/0150430 A1 | 9/2013 | Robbins et al. | |
| 2013/0150431 A1 | 9/2013 | Robbins et al. | |
| 2013/0242392 A1 | 9/2013 | Amirparviz et al. | |
| 2013/0250430 A1 | 9/2013 | Robbins et al. | |
| 2013/0250431 A1 | 9/2013 | Robbins et al. | |
| 2013/0334504 A1 | 12/2013 | Thompson | |
| 2014/0192418 A1 | 7/2014 | Suzuki | |
| 2015/0219834 A1 | 8/2015 | Nichol et al. | |
| 2016/0116739 A1* | 4/2016 | TeKolste | G02B 27/0172 |
| 2016/0031456 A1 | 10/2016 | Jones et al. | |
| 2016/0313567 A1 | 10/2016 | Kurashige | |
| 2016/0314564 A1 | 10/2016 | Jones et al. | |
| 2017/0003504 A1 | 1/2017 | Vallius | |
| 2017/0075119 A1 | 3/2017 | Schultz et al. | |
| 2017/0122725 A1 | 5/2017 | Yeoh | |
| 2017/0275396 A1 | 9/2017 | Ebisawa et al. | |
| 2017/0276947 A1 | 9/2017 | Yokoyama | |
| 2017/0285346 A1 | 10/2017 | Pan | |
| 2017/0285348 A1 | 10/2017 | Ayres et al. | |
| 2017/0363799 A1 | 12/2017 | Ofir et al. | |
| 2018/0101087 A1 | 4/2018 | Shiohara | |
| 2018/0210198 A1 | 7/2018 | Brown et al. | |
| 2018/0210202 A1* | 7/2018 | Danziger | G02B 6/0036 |
| 2018/0231783 A1 | 8/2018 | Weng et al. | |
| 2018/0267317 A1 | 9/2018 | Amitai | |
| 2018/0275409 A1* | 9/2018 | Gao | G02B 27/0093 |
| 2018/0284445 A1 | 10/2018 | Matsuki et al. | |
| 2018/0348562 A1 | 12/2018 | Yoshida | |
| 2019/0227215 A1* | 7/2019 | Danziger | G02B 27/0172 |
| 2020/0225476 A1 | 7/2020 | Urness et al. | |
| 2021/0018755 A1 | 1/2021 | Amitai | |
| 2021/0247608 A1* | 8/2021 | Eisenfeld | G02B 27/143 |
| 2022/0099885 A1 | 3/2022 | Ronen et al. | |

FOREIGN PATENT DOCUMENTS

| | | |
|---|---|---|
| CN | 109613644 A | 4/2019 |
| JP | H08-070782 | 3/1996 |
| JP | H09258062 | 10/1997 |
| JP | 2010044172 | 2/2010 |
| JP | 2014153545 A | 8/2014 |
| WO | 2018/013307 | 1/2018 |

OTHER PUBLICATIONS

Petros Stavroulakis et al: Suppression of backscattered diffraction from sub-wavelenght "moth-eye" arrays References and Links/ Optics Express 1, Endeavour Nanotechnology Zoolog_ Sci_ Philos_ Trans_ J_ Mod_ Opt Appl ppt. Opt. Acta {Lond.) Appl. Opt. Appl. Opt. Opt. Lett. Jpn. ☐Appl. Pjys. J. Ceram. Soc. Jpn. Opt. Commun. App;. Opt ppt. Lett. Nanotechno, Jan. 1, 1967, pp. 79-84.

Chin-Hao Chang el al: "Nanoslrulured gradient-index anlireflection diffractive optics", Optics Letters, vol. 36, No. 12, Jun. 5, 2011, p. 2354.

Piaoyin Yang et al: "Antireflection effects at nanostructured material interfaces and the suppression of thin-film nterference", Nanotechnology, vol. 24, No. 23, May 15, 2013, p. 235202.

R.. J_ Weiblen el al: "Optimized moth-eye anti-reflective structures for As_2S_3 chalcogenlide optical fibers", Optics Express vol. 24, Issue 10, pp. 10172-10187 (2016) •https://doi.org/10.1364/OE.24.010172.

Chih-Hao Chang, et al ;"Nanostructured gradient-index antireflection diffractive optics", in 354 Optics Letters / vol. 36, No. 12 / Jun. 15, 2011. https://sites.utexas.edu/chang/files/2015/02/Chang_OL_GRINGrating.pdf.

R. J. Weiblen et al; "Optimized moth-eye anti-reflective structures for As2S3 chalcogenide optical fibers" in Optics Express vol. 24, Issue 10, pp. 10172-10187 (2016) •https://doi.org/10.1364/OE.24.010172.

* cited by examiner

IMAGE DISPLAY SYSTEM WITH BEAM MULTIPLICATION

FIELD AND BACKGROUND OF THE INVENTION

The present invention relates to optical systems and, in particular, it concerns image display systems employing a waveguide in which beams of illumination are multiplied.

As an exemplary context for implementations of the present invention, various optical displays employ a light-guide optical element (LOE) (interchangeably referred to as a "waveguide" or a "substrate") for conveying an image from an image projector opposite the eye of a user, where it is coupled out, typically by an arrangement of partial reflectors or by a diffractive optical element, towards the eye.

In order to achieve uniformity of the viewed image, the waveguide should be uniformly "filled" with the projected image and its conjugate image. This imposes design limitations on the size of the image projector and various other aspects of the optical design.

SUMMARY OF THE INVENTION

The present invention is a light-guide optical system with a beam multiplication configuration to compensate for insufficient aperture filling by the image projector.

According to the teachings of an embodiment of the present invention there is provided, an optical system for displaying an image to an eye of a user including: a) a light-guide optical element (LOE) having two planar major external surfaces that are parallel so as to support propagation of image illumination within the LOE by internal reflection at the major external surfaces, the LOE having a thickness h between the major external surfaces, the LOE having a coupling-in region and a propagation region; (b) a coupling-out configuration associated with the propagation region of the LOE and configured for coupling out at least part of the image illumination from the LOE towards the eye of the user; (c) an image projector for generating image illumination corresponding to a collimated image, the image projector being optically coupled to the LOE so as to introduce the image illumination into the coupling-in region of the LOE so as to propagate within the propagation region of the LOE by internal reflection; and (d) a beam-multiplication configuration associated with the LOE and configured for beam multiplication of the image illumination introduced into the coupling-in region of the LOE, the beam-multiplication configuration including a transparent plate having mutually parallel external surfaces, the transparent plate bonded to a major external surface of the LOE adjacent to the coupling-in region, the transparent plate providing a partially-reflective surface between the LOE and the plate, and further providing a reflector, the partially-reflective surface and the reflector being arranged to reflect, into the propagation region, image illumination that was introduced into the coupling-in region so as to fully illuminate the propagation region with both the collimated image and a conjugate of the collimated image.

According to a further feature of an embodiment of the present invention, the transparent plate has a thickness of h/2.

According to a further feature of an embodiment of the present invention, the beam-multiplication configuration is configured to compensate for ½ aperture filling of the coupling-in region by the image projector.

According to a further feature of an embodiment of the present invention, the beam multiplication configuration includes a coupling-in configuration associated with a coupling-in region of the LOE and configured for coupling in the image illumination from the image projector into the LOE so as to propagate within the LOE by internal reflection.

According to a further feature of an embodiment of the present invention, the coupling-in configuration includes a wedge prism positioned between the image projector and the coupling-in region of the LOE, or a slanted edge at one end of the LOE between the image projector and the coupling-in region of the LOE.

According to a further feature of an embodiment of the present invention, the system includes a first beam-multiplication configuration configured to provide beam multiplication in a guided dimension of the LOE, and a second beam-multiplication configuration configured to provide beam multiplication in a non-guided dimension of the LOE.

According to a further feature of an embodiment of the present invention, the beam-multiplication configuration includes m partially reflective mutually parallel surfaces, where m is a positive integer, the m surfaces provided by m transparent plates, the beam-multiplication configuration configured to compensate for $1/(m+1)$ aperture filling, each plate having a pair of major parallel external surfaces, the m plates bonded together at their respective major parallel surfaces to form a stack that is bonded to a major external surface of the LOE, the reflector provided by an external surface of the $m^{th}$ plate, being the plate furthest from the LOE each of the m plates having a thickness that is equal to $1/(m+1)$ of the thickness h of the LOE.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a light-guide optical system with beam multiplication, the principles and operation of which may be better understood with reference to the drawings and the accompanying description.

Figure 1A:
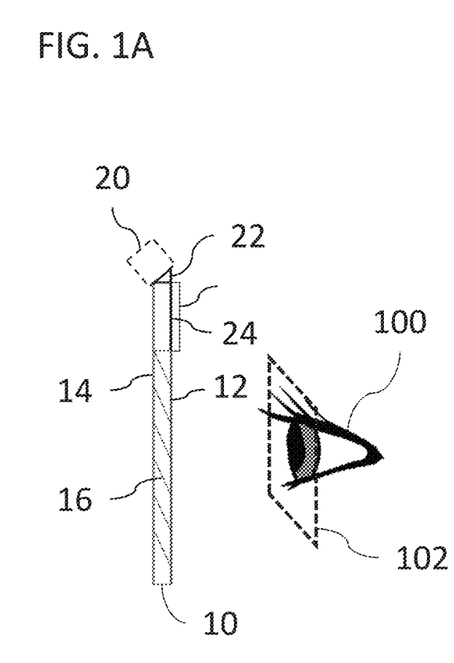
FIGS. 1A and 1B are schematic side views illustrating an image-projecting waveguide system with beam multiplication according to an embodiment of the present invention, employing reflective and diffractive beam directing components, respectively.
Figure 1B:
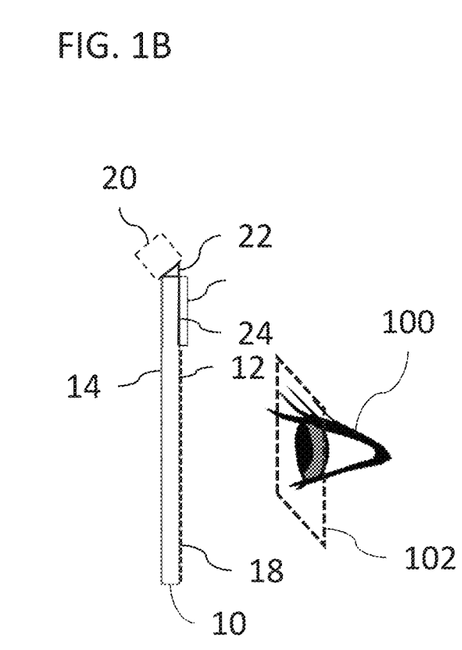

Referring now to the drawings, FIGS. 1A and 1B illustrate schematically an implementation, according to the teachings provided herein, of an optical system for displaying an image to an eye 100 of a user, located within a region referred to as the eye motion box (EMB) 102. The system includes a light-guide optical element (LOE) 10 (interchangeably referred to as a "waveguide" or a "substrate") having two planar major external surfaces 12, 14 that are parallel so as to support propagation of image illumination within the LOE by internal reflection (TIR) at the major external surfaces. The LOE of the present system can be considered as being virtually divided along its width into at least functionally different regions, referred to herein as the "coupling-in region" and the "propagation region", as will be further detailed below.

A coupling-out configuration is associated with at least part of the propagation region of the LOE, and is configured for coupling out at least part of the image illumination from the LOE towards the eye 100 of the user. In certain embodiments, the coupling-out configuration is implemented as a set of mutually-parallel partially reflecting surfaces 16, deployed within the LOE and obliquely oriented relative to the major external surfaces, as illustrated in FIG. 1A. In other embodiments, the coupling-out configuration is implemented as at least one diffractive optical element 18 associated with LOE 10 and configured for progressively coupling out a part of the image illumination towards the eye of the user, as illustrated in FIG. 1B. In some embodiments, the coupling-out configuration may be associated with the entirety of the propagation region such that the image is progressively coupled-out along the entire length of the propagation region. In other embodiments, coupling-out configuration may be associated with only a part of the propagation region such that the propagation region includes portions in which the image only propagates without being coupled-out.

An image projector 20, interchangeably referred to as a "POD", generates image illumination corresponding to a collimated image. Image projector 20 is optically coupled to LOE 10 so as to introduce the image illumination into the coupling-in region of the LOE so as to propagate within the LOE by internal reflection. The POD employed with the devices of the present invention is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions.

Image projector 20 includes at least one light source, typically deployed to illuminate a spatial light modulator, such as an LCOS chip. The spatial light modulator modulates the projected intensity of each pixel of the image, thereby generating an image. Other embodiments of image projector 20 may include OLED or micro-LED illumination sources. Alternatively, or additionally, the image projector may include a scanning arrangement, typically implemented using a fast-scanning mirror, which scans illumination from a laser light source across an image plane of the projector while the intensity of the beam is varied synchronously with the motion on a pixel-by-pixel basis, thereby projecting a desired intensity for each pixel. In both cases, collimating optics are provided to generate an output projected image which is collimated to infinity. Some or all of the above components are typically arranged on surfaces of one or more polarizing beam-splitter (PBS) cube or other prism arrangement, employing reflective optics, as is well known in the art. Alternatively, a free-space optics implementation with reflective and/or refractive optics may be used. Details of the image projector are not per se part of the present invention, and in order to simplify presentation, the image projector is represented here schematically as a dashed box, without any attempt to illustrate the individual components.

Figure 2:
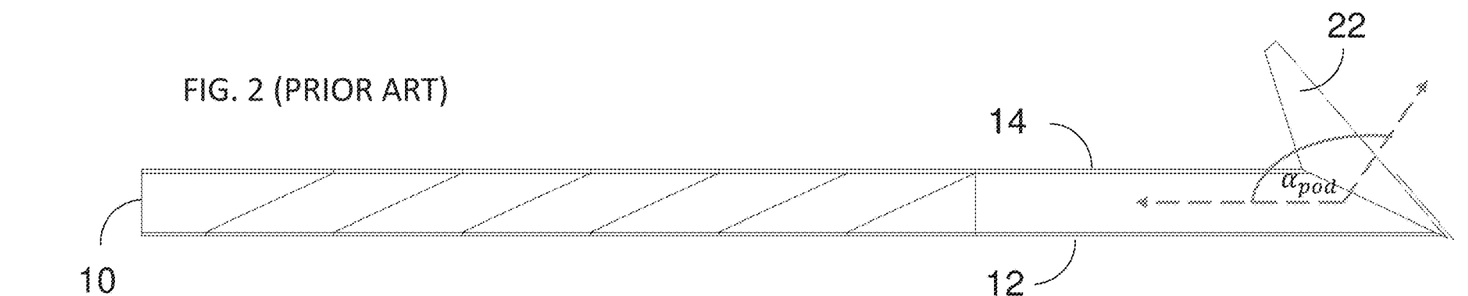
FIG. 2 is a schematic side view of a waveguide employing a coupling-in wedge according to a conventional coupling-in geometry.

Optical coupling of image projector 20 to LOE 10 may be achieved by any suitable optical coupling, such as for example via a coupling-in prism with an obliquely angled input surface, or via a reflective coupling arrangement, via a side edge and/or one of the major external surfaces of the LOE. Examples of coupling in via a wedge prism may be found in PCT publication no. WO2015162611. Various examples of coupling in using a mirror may be found in PCT publication no. WO2001095027. Except where otherwise specified below, details of the optical coupling between the image projector and LOE are typically not critical to the invention, and are shown here schematically as a non-limiting example of a wedge prism 22 applied to an edge surface of LOE 10. Furthermore, implementations of the present invention that are illustrated herein using a coupling-in prism can equally be implemented using a reflective coupling-in arrangement, and vice versa. The coupling-in arrangement determines an angle between the POD and the LOE, denoted as $\alpha_{pod}$ in FIG. 2.

An aspect of the present invention illustrated in FIGS. 1A, 1B and 4-14 relates to a range of configurations in which light of a collimated image is guided by, but does not completely "fill" (also referred to herein as "illuminate"), a light-guide optical element (LOE) having a pair of major parallel external surfaces, and in particular, where the image propagates without being an image/image-conjugate pair at every point along the LOE. In such situations, according to an aspect of the present invention, it has been found particularly effective to provide a beam-multiplication configuration associated with a coupling-in region of the LOE and configured for beam multiplication of the image illumination introduced into the coupling-in region of the LOE so as to fully illuminate the propagation region with the image and its conjugate, as will be detailed below.

Accordingly, the optical system shown in FIGS. 1A-1B includes at least one transparent plate 26 situated adjacent to the lower surface 12 of LOE 10. In the embodiment shown in FIGS. 1A-1B, a single transparent plate 26 is shown. The transparent plate 26 includes a partially reflective surface 24 at or near surface 12 that acts as a beam splitter (also referred to as "beam multiplier" and/or "beam duplicator") such that a portion of light hitting the beam splitter is reflected back into LOE 10 and a portion of light is transmitted through plate 26 to be reflected by the outer surface of plate 26 into LOE 10. Further details of the beam-multiplication configuration of the present invention are provided below.

Figure 3A:
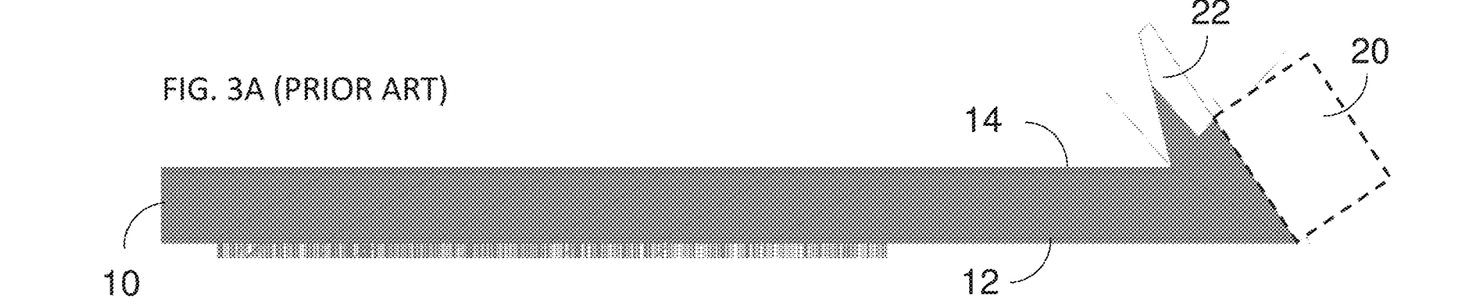
FIGS. 3A and 3B illustrate the results of different size illumination apertures introduced into the waveguide of FIG. 2 achieving full and partial filling of the waveguide, respectively.

In order to better illustrate the advantage provided by the beam-multiplication configuration shown in FIGS. 1A-1B, FIGS. 2 and 3A illustrate a coupling-in configuration employing a wedge prism 22 according to a conventional approach without the beam-multiplication configuration presently disclosed. The LOE should provide image illumination to the human eye in a uniform distribution over all propagating angles of light (also referred to as "fields" or "field of view"—FOV) and throughout the EMB 102. To this end, each field's aperture should be evenly filled with light. In other words, for any angle of illumination, corresponding to a pixel within the collimated image, the entire cross-section of the LOE in a plane perpendicular to the major surfaces of the LOE should be filled with both the image and its reflection (conjugate) such that, at any point in the LOE volume, rays are present corresponding to all pixels of both the collimated image and its conjugate. In order to achieve this result, as illustrated in FIG. 3A, a relatively large-aperture image projector 20 is used together with an extension to one major surface 12 of the LOE so that the aperture of LOE 10 received full direct illumination of the image and full reflected illumination of the conjugate image internally reflected from surface 12. Image projector 20 must have a correspondingly large aperture to fill the LOE aperture in this manner.

Figure 3B:
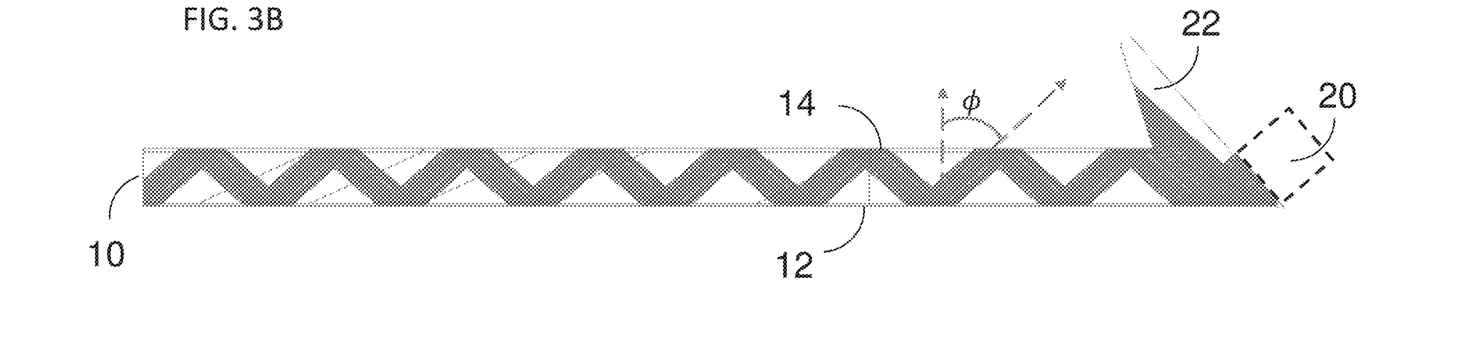

If the "filling" condition is not met, the light shined into the eye will not be evenly distributed. An example of a narrow illumination beam which fails to meet this criterion is shown in FIG. 3B, where a smaller image projector 20 is used with an optical configuration that is otherwise similar to FIG. 3A. When there is a lack of aperture filling, the light exiting the LOE will not be evenly distributed. Non-uniformity of filling of the LOE can occur for a number of reasons, including but not limited to, use of a small aperture projector, use of a small coupling-in geometry, and certain configurations of internal facet reflections.

Figure 4:
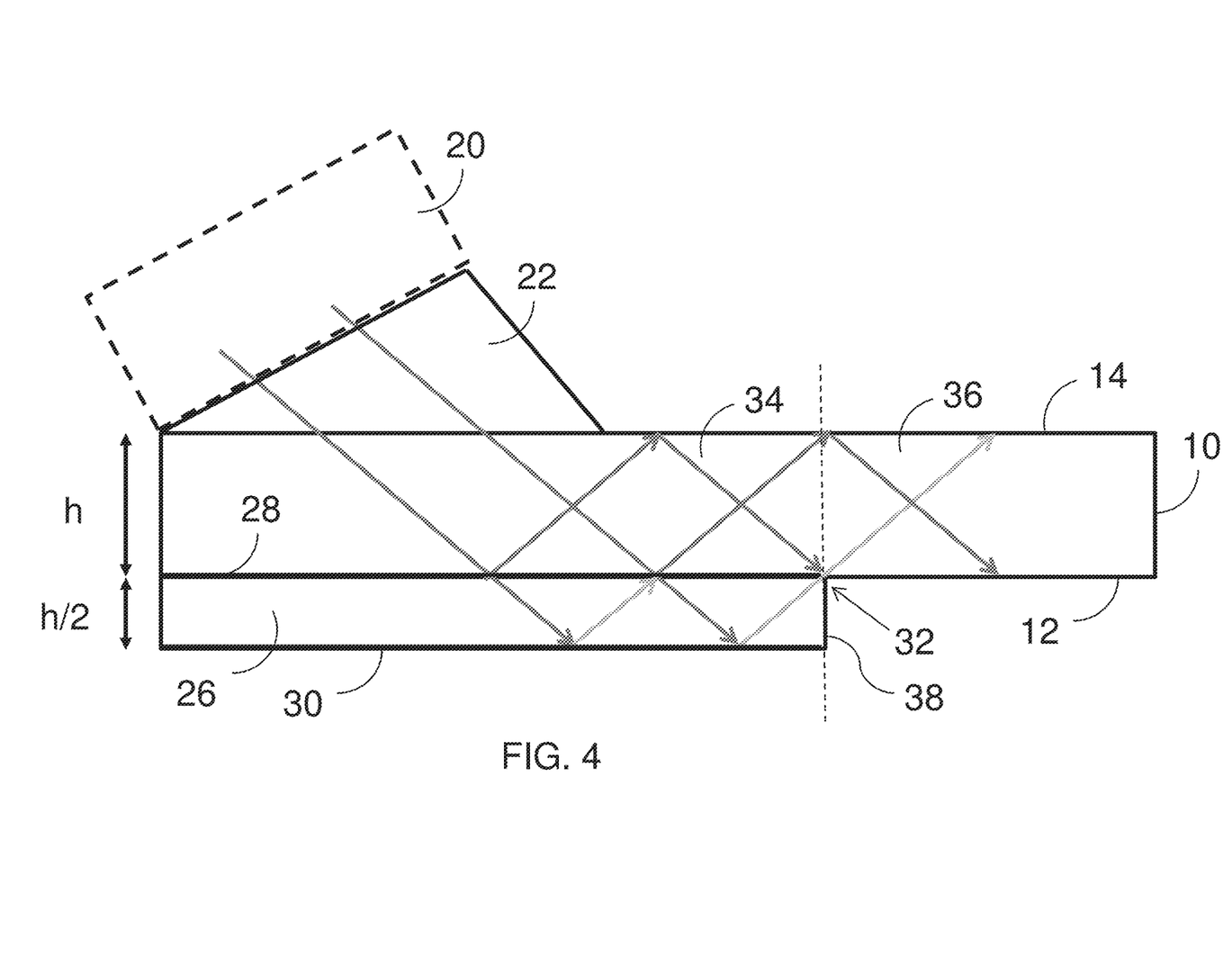
FIGS. 4-6 are schematic side views of embodiments of the image display system for compensating for half aperture filling, one-third aperture filling, and one-quarter aperture filling, respectively.
Figure 5:
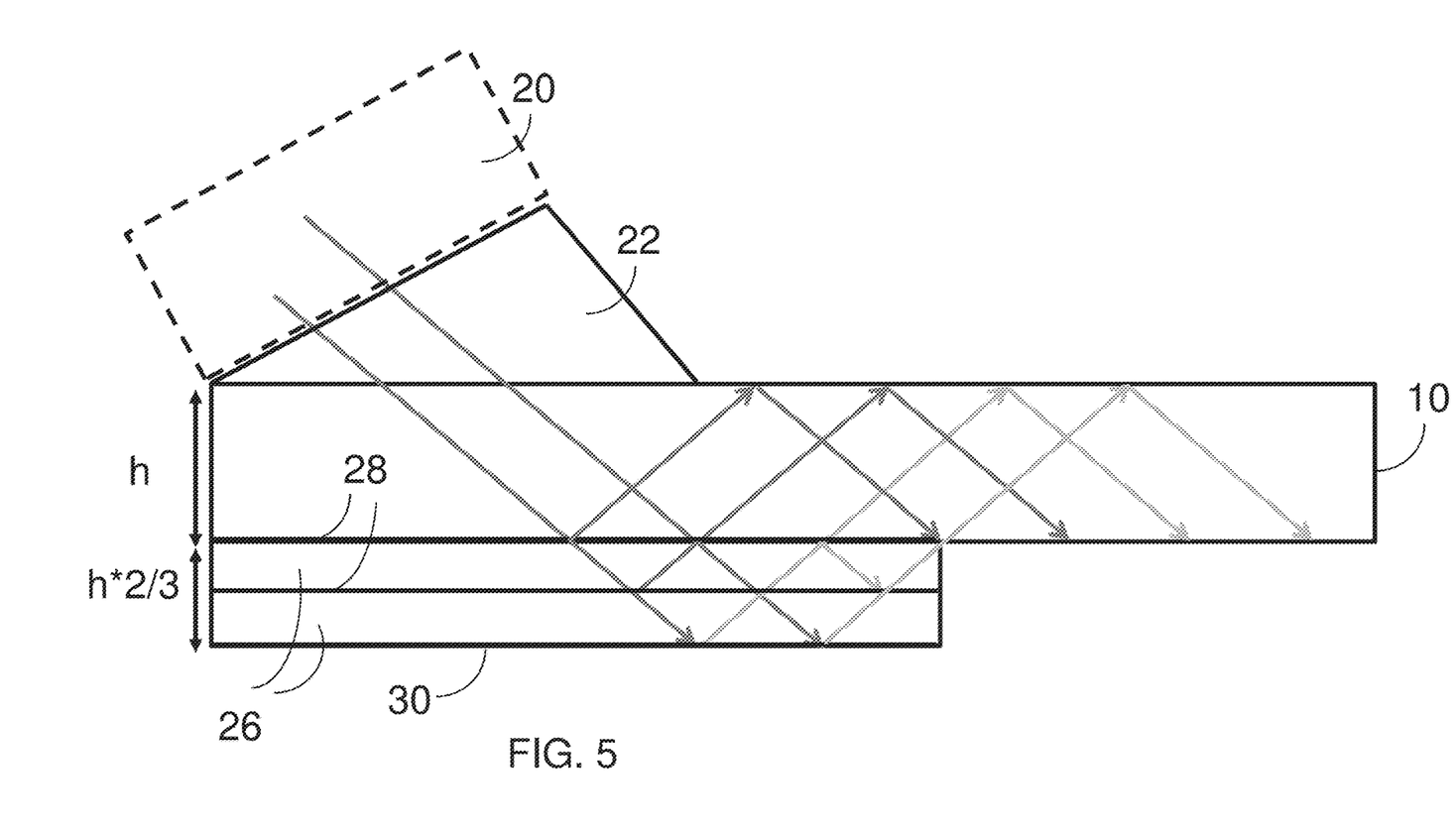
Figure 6:
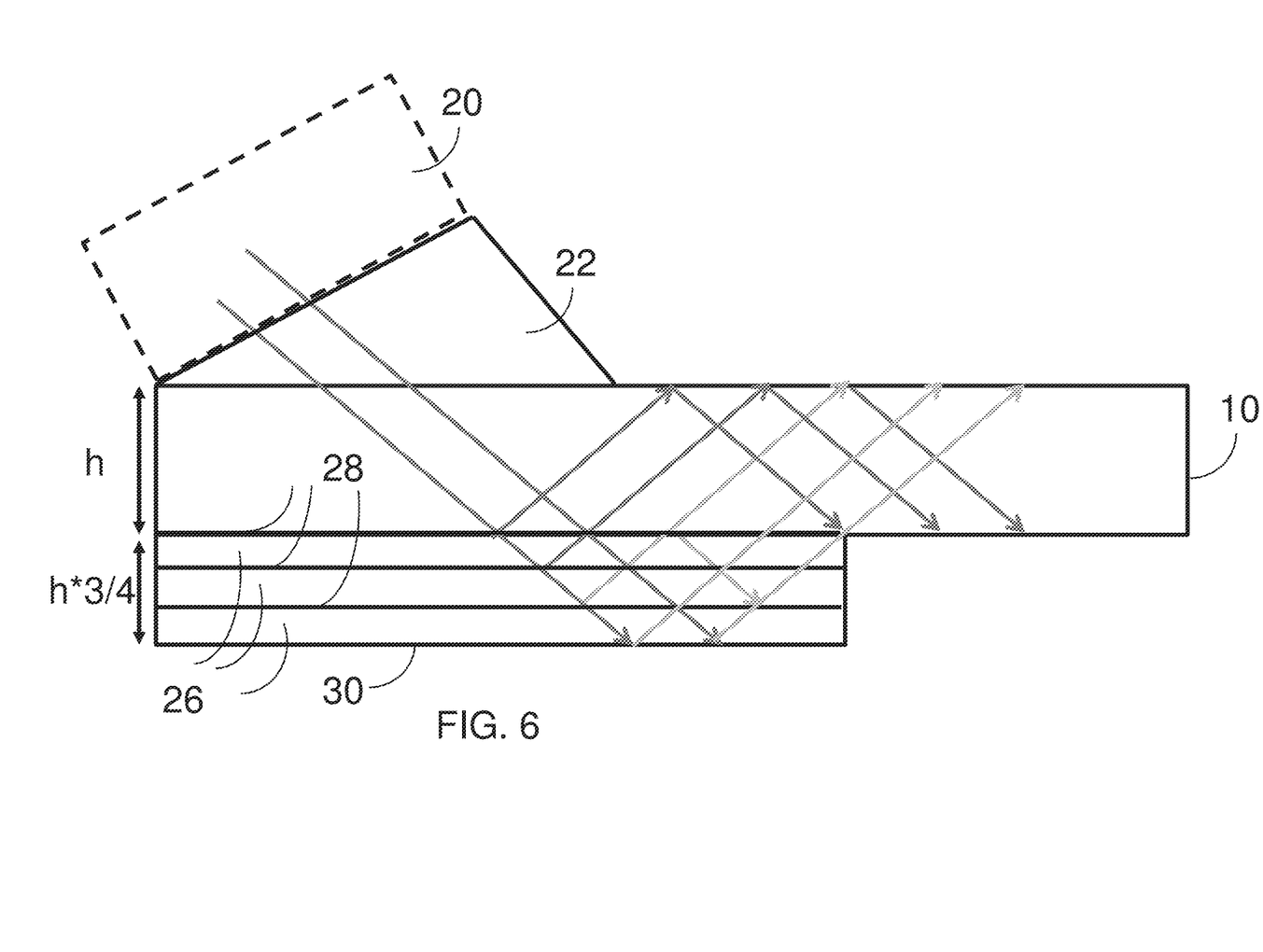

Referring now to FIGS. 4-6, optical systems according to embodiments of the present invention, which compensate for the partial filling of the aperture, are disclosed. Generally speaking, each of the optical systems includes an LOE 10 having two planar major external surfaces 12, 14 that are parallel so as to support propagation of image illumination within the LOE by internal reflection at the major external surfaces. The LOE has a thickness h between the major external surfaces. Along the length of the LOE, the LOE includes first a coupling-in region 34 followed by a propagation region 36. As distinct from the coupling-in region, the propagation region is surrounded by an air barrier (or alternatively reflecting mirrors) such that image illumination introduced into the propagation region undergoes TIR between the major external surfaces 12, 14.

The image is introduced into coupling-in region 34 by a projector 20 configured for generating image illumination corresponding to a collimated image, and is optically coupled to the LOE so as to introduce the image illumination into the coupling-in region of the LOE so as to propagate within the propagation region of the LOE by internal reflection.

The optical system further includes a beam-multiplication configuration associated with the LOE and configured for beam multiplication of the image illumination introduced into the coupling-in region of the LOE, the beam-multiplication configuration comprised of m partially reflective mutually parallel surfaces 28, where m is a positive integer, the m surfaces being external to the LOE and parallel to the major external surfaces of the LOE. The beam-multiplication configuration further comprises a reflector 30. The m surfaces and reflector are arranged to reflect, into the propagation region 36, image illumination that was introduced into the coupling-in region 34 so as to fully illuminate the propagation region 36 with both the image and its conjugate.

The optical system further includes a coupling-out configuration, typically implemented as facets 16 or diffractive element 18 (omitted for clarity in FIGS. 4-6 but shown in FIGS. 1A-1B) that is associated with the propagation region 36 and configured for coupling-out at least part of the image illumination from the LOE towards the eye of a user.

Throughout this description, a partially reflective surface 28 is also referred to herein as a "partial reflector", while a fully reflective surface 30 is referred to simply as a "reflector". As will be detailed below, the reflector and partial reflector(s) are provided by one or more transparent plates 26. Generally speaking, m plates are used to compensate for 1/m aperture filling. The m plates provide m+1 reflective surfaces including one (1) reflector and m partial reflectors. The reflector is typically implemented as an external surface of a plate that fully reflects impinging rays by TIR. Alternatively, in some embodiments the reflector can implemented as a mirror.

Referring now to FIG. 4, a schematic representation of a cross-section of an optical system is shown in which the beam-multiplication configuration compensates for half (½) aperture filling by the image projector. In this case, a single transparent plate 26 provides a partial reflector 28 and a reflector 30, and is bonded to external surface 12 (also referred to herein as the "lower" major external surface) of the LOE adjacent to the coupling-in region 34.

Transparent plate 26 partially extends along the length of the lower major external surface 12 of the LOE adjacent to the coupling-in region 34. The end point 32 of plate 26 (referred to herein as the "critical point"), marks the end of the coupling-in region 34 and the entrance to the propagation region 36 of the LOE, although the distinction between coupling-in region and propagation region is purely conceptual as there is no physical barrier at the junction between these regions. In some embodiments, plate 26 includes an edge 38 at the critical point, the edge being perpendicular to the major external surfaces of the LOE. Importantly, no image illumination may enter the propagation region after impinging on edge 38. In some embodiments, in the case of two or more plates, only the plate that is closest to the LOE (in fact adjacent to the LOE) must fully extend alongside the coupling-in region 34 and end with an edge 38 at point 32.

In this case, as shown in FIG. 4, the beam-multiplication configuration compensates for the ½ aperture filling by beam multiplication (also referred to herein as "beam duplication") of the image illumination entering the propagation region such that the propagation region is fully illuminated by both the image (shown as downward arrows) and its conjugate (shown as upward arrows). As shown in FIG. 4, each ray is duplicated by the beam splitter, with part of the ray reflecting off of the partial reflector 28 and part of the ray reflecting off of the full reflector 30, thereby effectively extending the critical point 32 further along the length of the LOE such that each ray and its conjugate now fills the propagation region 36 of the LOE, thereby compensating for the small aperture filling by the projector which would be insufficient to fully illuminate the propagation region with both the image and its conjugate. To achieve a uniform intensity distribution of the image and the conjugated image, the lower surface of the transparent plate 26 acts as a full reflector 30 (e.g. via TIR or mirror coating), and ideally the top surface of plate 26 should be coated to uniformly reflect between 36% and 40%, and most preferably 38.2%, of the impingent light in the angular range of the image.

Parenthetically, it should be understood that projector 20 can alternatively inject a conjugate of the image, in which case the downward would in fact represent the conjugate and the upward arrows the image. As such, throughout this description the terms "image" and "conjugate" should be understood to be interchangeable such that references to "image" can also mean the conjugate of the image, in which case any references to the "conjugate" will be understood as referring to the image.

The optical system may in some embodiments include a wedge 22 coupling-in configuration between projector 20 and LOE 10.

As discussed above, compensation for smaller fractional aperture filling is also contemplated. FIG. 5 shows an optical device which compensates for injected light rays which only fill ⅓ of the size of the region filled by full-aperture injected rays (i.e., ⅓ of the size of the filled by the light rays shown in FIG. 3A). Without compensation, the LOE will only be partially filled (FIG. 3B). In order to compensate for ⅓ aperture filling (N=3), two (N−1=2) partial reflectors 28 are required. In the exemplary implementation illustrated in FIG. 5, the two partial reflectors are implemented using two transparent plates 26 whose total combined thickness is given by h*⅔, with each individual transparent plate 26 having a thickness of h/3. In this case, two transparent plates 26 are bonded together forming a "stack" that is then bonded to surface 12 of the LOE adjacent to the coupling-in region 34. The two transparent plates are bonded at their major external surfaces and collectively provide two partial reflectors 28 and a reflector 30.

To achieve a uniform distribution of the image the conjugated image, the interface between the top (first) plate and the LOE may include partially reflective coating having between 21% and 24%, and preferably 22.8%, reflectivity. The interface between the bottom (second) plate and the top (first) plate can be coated with a partial reflective coating having between 37% and 40%, and preferably 38.2%, reflectivity. The lower major external surface of the bottom (i.e., second) transparent plate acts as a full reflector similar to as described with reference to FIG. 4.

FIG. 6 shows an optical device which compensates for injected light rays which only fill ¼ of the size of the region filled by full-aperture injected rays (i.e., ¼ of the size of the filled by the light rays shown in FIG. 3A). In order to compensate for ¼ aperture filling (N=4), three (N−1=3) partial reflectors 28 are required. In the exemplary implementation illustrated in FIG. 6, the three partial reflectors 28 are implemented using three transparent plates 26 whose total combined thickness is given by h*¾, with each individual transparent plate having a thickness of h/4.

To achieve a uniform distribution of the image the conjugated image, the interface between the top (first) plate and the LOE may include partially reflective coating having between 15% and 17%, and preferably 16.1%, reflectivity. The interface between the middle (second) plate and the top (first) plate can be coated with a partial reflective coating having between 21% and 24%, and preferably 22.8%, reflectivity. The interface between the middle (second) plate and the bottom (third) plate can be coated with a partial reflective coating having between 37% and 40%, and preferably 38.2%, reflectivity. The lower major external surface of the bottom (i.e., second) transparent plate acts as a full reflector similar to as described with reference to FIGS. 4 and 5.

Generally speaking, the beam-multiplication configuration includes m partially reflective surfaces parallel to the major external LOE surfaces which are provided by m transparent plates, where m is a positive integer. The number of partial reflectors is determined according to the equation m=N−1, where 1/N represents the fraction of the aperture filling that is to be compensated for. The partial reflector(s) is/are deployed in spaced relation, with the first partial reflector at or near the lower major external surface 12 of the LOE. The spacing between the partial reflectors is proportional to the thickness h of the LOE and dictated by the thickness of the plate(s). The full reflector 30 is deployed below the partial reflector(s), and in particular below last partial reflector (which is also the first partial reflector when only one partial reflector is used). The full reflector is deployed in spaced relation relative to, and below, the last partial reflector, such that the effective spacing between the full reflector and lower major external surface 12 of the LOE (equivalently, or approximately equivalently, the first partial reflector) is also proportional to h. In general, the effective spacing between the full reflector and the lower major external surface of the LOE can be expressed by the formula h*(N−1)/N. To achieve such spacing, the thickness of each of the m plates should preferably be 1/(m+1) of h.

In the case of more than one transparent plate, each interface between plates as well as the interface between the $1^{st}$ plate (i.e. the plate adjacent to the LOE) and the LOE includes a partially reflective coating. A number of different coating methods are possible. For example, each plate can be coated on one surface and bonded together and to the LOE such that each interface includes the partially reflective coating. Alternatively, every other plate (i.e. alternating plates in the stacks) can each be coated on both major external surfaces with the partially reflective coating. Alternatively, the partial reflectivity can be achieved by stacking plates of different refractive indexes (or using optical adhesive) selected so as to generate the desired partial reflections at the interface between plates. Alternatively, the optical adhesive between plates can have refractive indexes different from the plates, selected so as to generate the desired partial reflections.

In order to achieve uniform intensity of the image and of the conjugated image, the top surface of a plate i should be coated to achieve an ideal partial reflectivity of $$R_i = \frac{\frac{1}{2} + R_{i+1} - \sqrt{\frac{1}{4} + R_{i+1}}}{R_{i+1}},$$

where the bottom surface of the $m^{th}$ plate (i.e. the plate furthest from the LOE) is $R_{m+1}=1$, due to TIR.

Preferably, the reflectance of each of the m successive partial reflectors is given using the equation for $R_i$ detailed above. however the proportion of reflectance is a parameter which may not be precisely defined or precisely achievable in all cases, at least not for the entire angular range of the image (field of view), and the intention here is to refer to values sufficiently close to the theoretical value that the resulting intensity distribution if sampled would be perceived visually as uniform across the thickness of the LOE. For a single partial reflector (m=1) an error of 5-10% in the reflectivity are visually acceptable even only after one half-cycle. More generally, variations of ±5%, or even ±10% in the reflectances may in certain cases render results which are sufficiently close to optimum to be visually acceptable. Parallelism between the partial reflector layer(s) and the major external surfaces of the LOE should be preserved, and the subdivision of the thickness into equal portions is preferably performed to an accuracy of within 10%, and preferably more accurately, in order to avoid generating stripes of non-uniform intensity during the beam multiplication process.

Structurally, the partial reflectivity of the beam multiplying configuration can be implemented using any suitable partially-reflective layer or coating, including but not limited to, a metallic coating, a structural partial reflector (e.g., polka-dot patterned reflector) and multi-layer dielectric coatings. In some embodiments, the partially-reflective coatings may be preferably implemented using an angle-dependent reflective coating in which the coating has the desired reflectivity according to the sequence described above at angles in a range corresponding to angles of image light propagation within the LOE while having low reflectivity at small angles (close to perpendicular to the beam splitter), so as to provide less attenuation of light from the directly viewed scene. Layers with such angle-dependent reflectance can readily be achieved using multi-layer dielectric coatings, and are easy to manufacture since the required properties are essentially similar to Fresnel reflection properties. Design of multi-layer coatings to provide such angularly-dependent reflectivity can be performed using standard software packages, as is common practice in the art, and suitable coatings can be obtained commercially from many sources. Accordingly, for conciseness of presentation, the details will not be addressed here.

Although the embodiments described thus far have pertained to beam multiplication when using a wedge as the coupling-in mechanism for injecting light rays into the LOE, other embodiments are possible in which other coupling-in geometries are contemplated.

Figure 7:
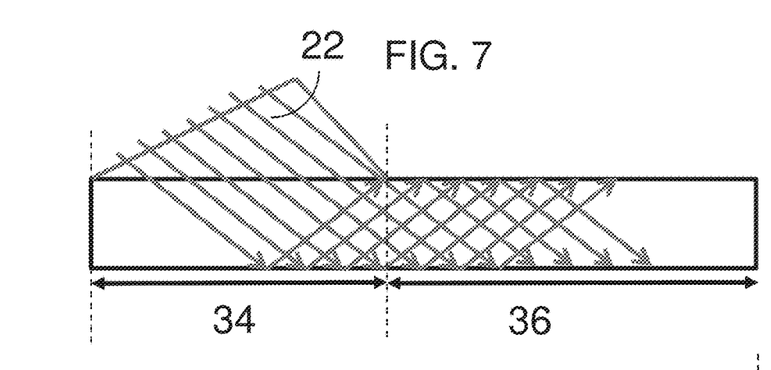
FIG. 7 illustrates a size of the coupling-in region of conventional optical systems using a wedge coupling-in configuration.

By way of introduction, FIG. 7 reiterates the full aperture filling of an LOE when using a wedge 22 as the coupling-in mechanism. The wedge is optically designed such that the aperture is completely filled—i.e., there are upgoing and downgoing light rays at every point in the cross-section of the LOE in a plane perpendicular to the major external surfaces of the LOE. The size of the coupling-in region 34 is determined by the wedge and the field of view, and is designed such that there is overlap between the upgoing and downgoing rays for all fields inside the LOE. In configurations where the chief ray is coupled out of the LOE normal to the LOE, the angle of the wedge, relative to the LOE, is selected to be perpendicular to the chief light ray. However, if a slight tilt is added to the LOE (for example for aesthetic reasons), the angle of wedge should be adjusted to account for the tilt angle, so as to minimize chromatic aberrations. In addition, the length of the wedge is determined according to the shallowest light ray that can be guided through the LOE. The propagation region 36 begins at the end of the coupling-region 34 and continues throughout the length of the LOE.

As discussed above in detail, the fractional-aperture filling technique with beam multiplication (e.g., the half-aperture filling technique shown in FIG. 4 and reproduced in greater detail in FIG. 8), relies on using one or more transparent plates 26 to duplicate the incoming light rays in order to completely fill the aperture. However, as evident from FIG. 8, the transparent plate 26 increases the size of the coupling-in region 34 (i.e., the transparent plate extends along a significant portion of the lower major external surface 12 of the LOE) when compared with the full-aperture methodology illustrated in FIG. 7.

Figure 8:
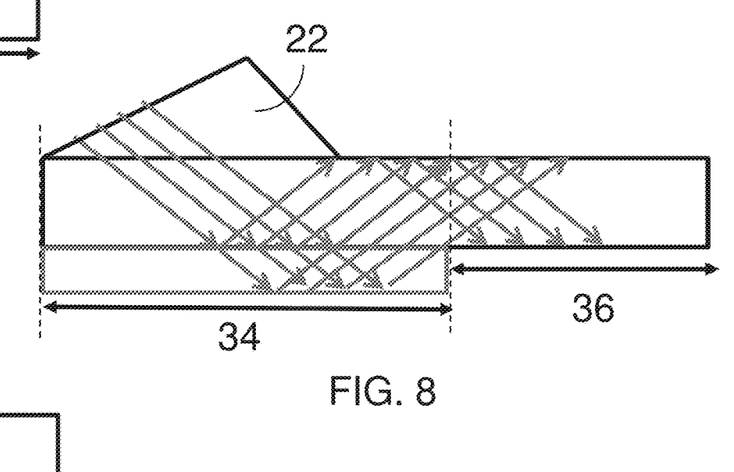
FIG. 8 illustrates a size of the coupling-in region of embodiments of the disclosed optical system using a wedge coupling-in configuration.
Figure 9:
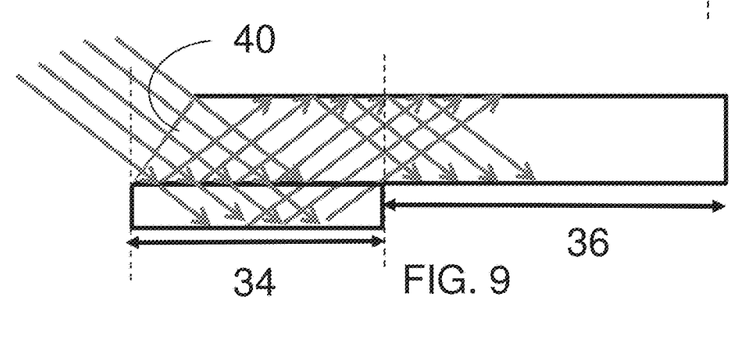
FIG. 9 illustrates a size of the coupling-in region of embodiments of the disclosed optical system using a slanted edge coupling-in configuration.

Bearing the above in mind, FIG. 9 illustrates an optical device, according to embodiments of the present invention, having a beam multiplication mechanism that simultaneously decreases the size of the coupling-in region 34 when compared to the coupling-in region 34 of FIG. 8. In such embodiments, a full aperture is illuminated, however, the wedge coupling-in mechanism is replaced by a slanted edge 40 (i.e., an edge at an angle to the parallel major external surfaces of the LOE). In general, the specific angle of the slanted edge 40 is selected according to the same criteria as used to select the angle of the wedge, discussed above. Since there is no wedge to duplicate the upgoing and downgoing light rays, the light rays are injected directly into the LOE via the slanted edge 40. A transparent plate 26 (similar to as previously described) duplicates and overlaps the upgoing and downgoing light rays. Furthermore, since there is no wedge to act as the coupling-in mechanism, the overall input aperture of the optical device is smaller (as compared to the optical device of FIG. 8), and the size of the coupling-in region 34 (i.e., as defined by the length of the transparent plate) is smaller than the size of the coupling-in region 34 of FIG. 8. As an aside, the reduced overall input aperture has the added advantage of reducing the overall form factor of the optical device, which is suitable for use in near eye display (NED) systems.

To this point, discussion of input aperture extension has been discussed with respect to aperture extension in the guided dimension of LOE 10. In some cases, aperture extension in the non-guided dimension is also necessary. As used herein, "guided dimension" refers to a dimension between the major surfaces in which light is guided by TIR, and "unguided dimension" refers to a dimension extending parallel to the major surfaces in which the light path expands without being limited by internal reflection.

Figure 10:
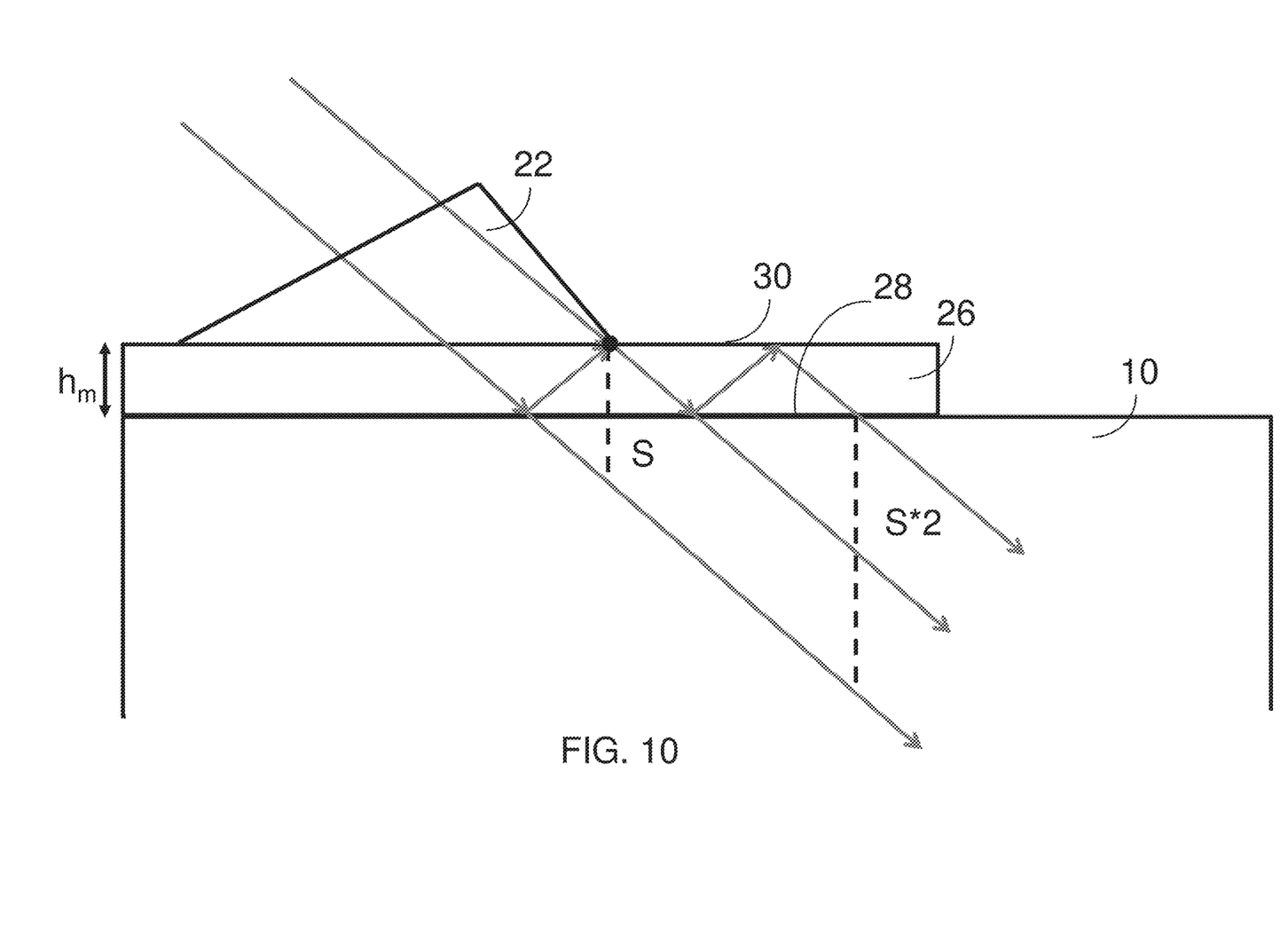
FIGS. 10-11 are schematic side views of embodiments of the disclosed optical system in which the aperture is extended in the non-guided dimension.

FIG. 10 illustrates an optical system in which the aperture is extended in the non-guided dimension. In order to compensate for partial filling of the aperture when the light rays are not guided by TIR, a transparent plate 26 having a lower major surface 28 coated with a partially reflective coating, is deployed between the wedge 22 and an edge of LOE 10, such that a portion of the upper major external surface of the transparent plate 26 acts as a mirror 30 and the lower major external surface of the transparent plate acts a partial reflector 28. The transparent plate effectively reflects incoming light rays, such that the partially filled input light rays are duplicated. In order to fill the entire aperture, the thickness $h_m$ of the transparent plate 26 is selected has half of the aperture stop S of the optical system.

Figure 11:
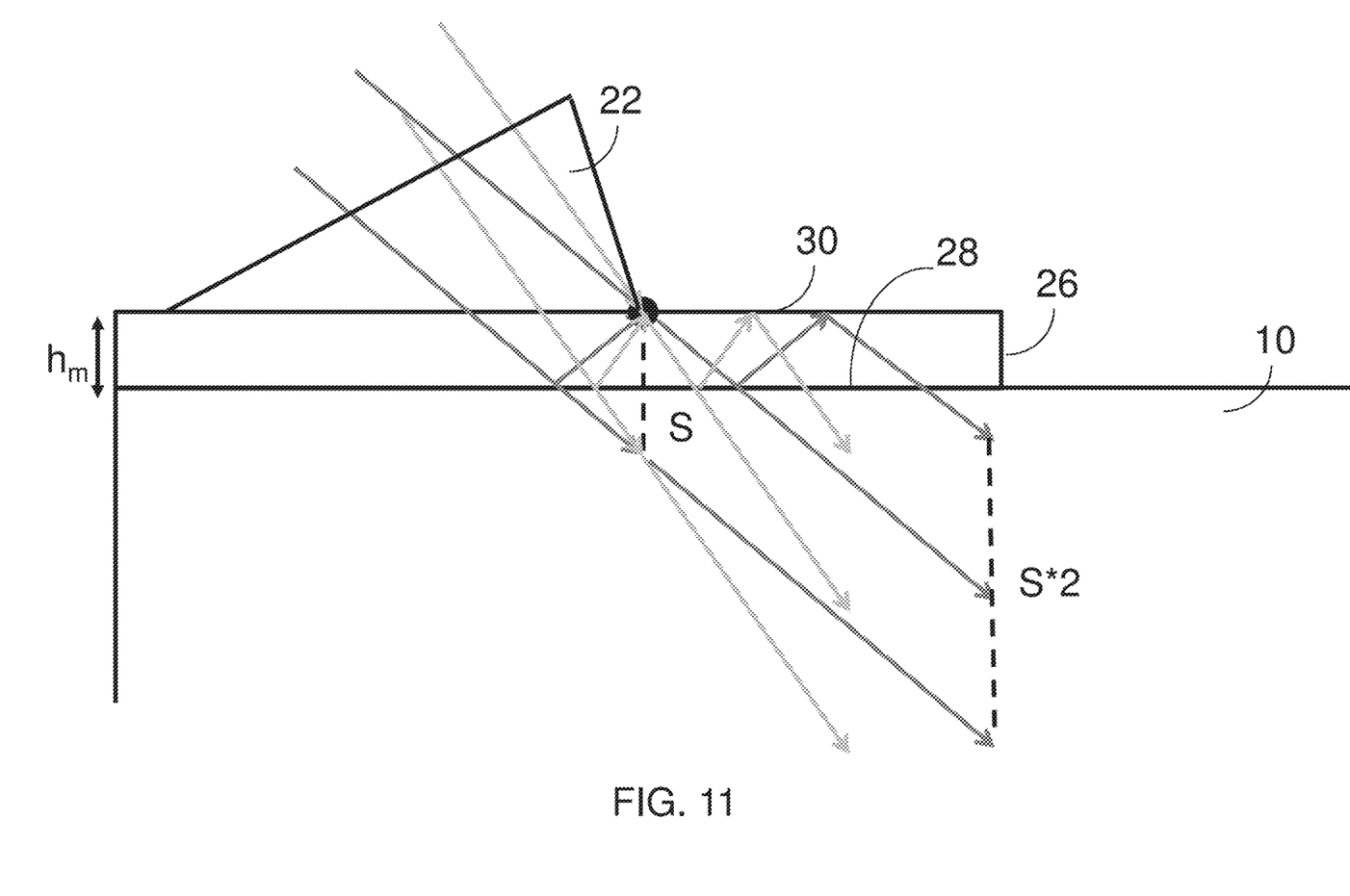

FIG. 11 shows another depiction of the optical system of FIG. 10, with the additional illustration of light rays from different fields (denoted by the non-parallel sets of parallel light rays) all filling the stop S of the optical system (which is half the size of the original full-aperture optical system).

Figure 12:
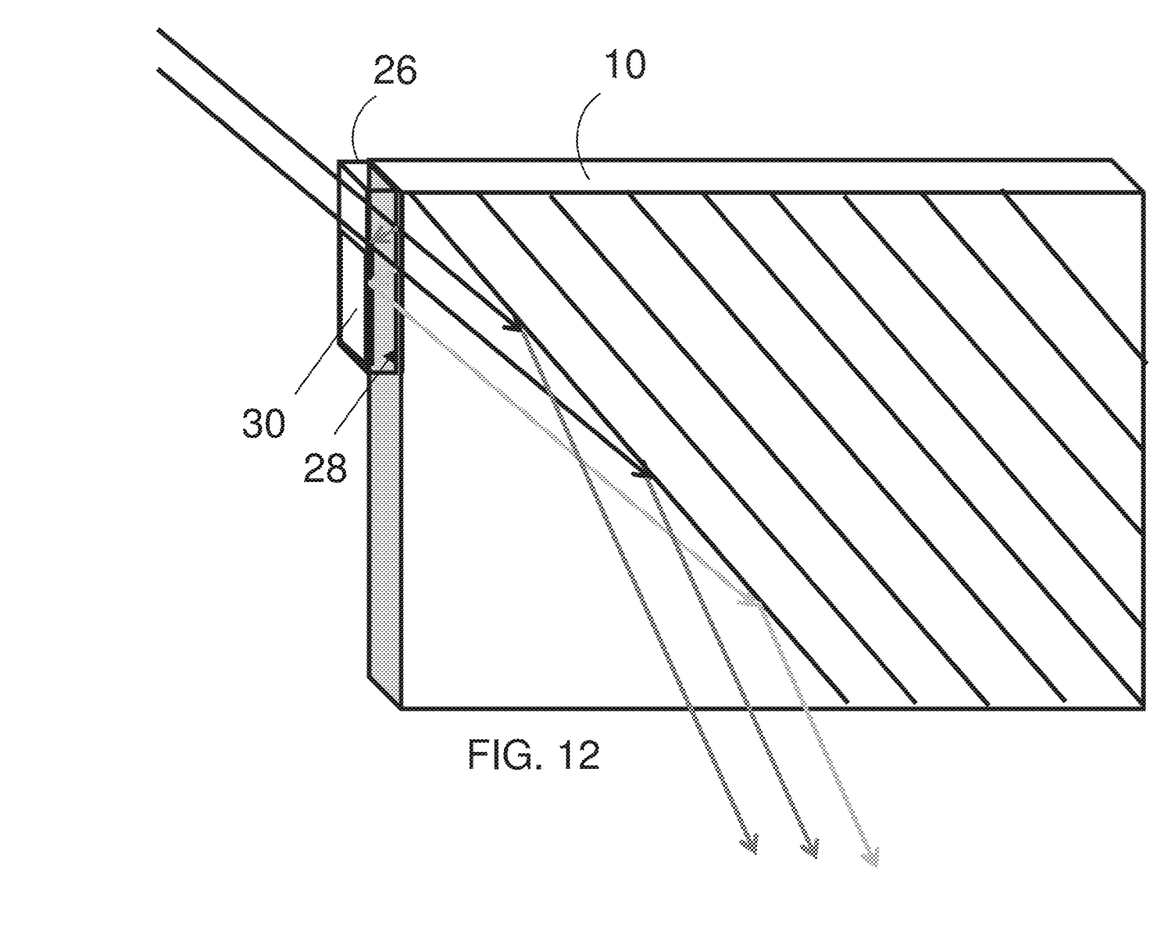
FIG. 12 is an isometric view of the optical system of FIGS. 10 and 11.

FIG. 12 is an isometric view of the optical system of FIGS. 10 and 11, showing the transparent plate 26 coupled to the LOE input. For clarity, the coupling-in configuration is not shown in FIG. 12 but is assumed to be present. The two light rays are duplicated by the transparent plate 26 and then propagate within the LOE before reaching the coupling-out configuration (shown in FIG. 12 as diagonal lines representing facets) and being coupled out towards the EMB (not shown).

Figure 13:
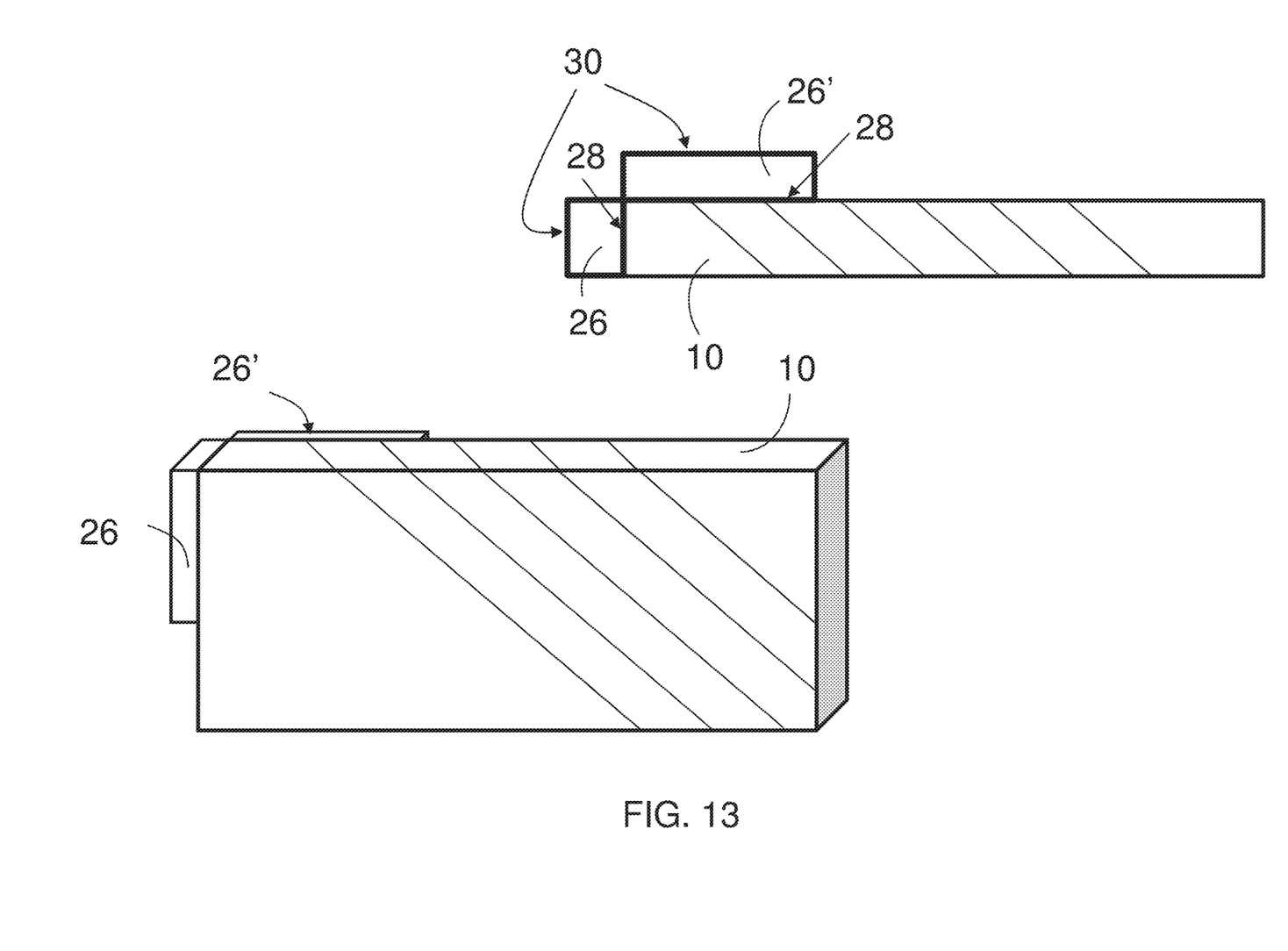
FIG. 13 is an isometric view of an optical system in which the aperture is extended in both the guided and non-guided dimension.

FIG. 13 shows a cross-sectional view and isometric view, respectively, of an embodiment of the optical system similar to that of FIG. 12, but with an additional transparent plate 26' at the LOE input for performing beam duplication in the guided dimension of the LOE (as discussed with reference to, for example, FIGS. 4-9).

Figure 14:
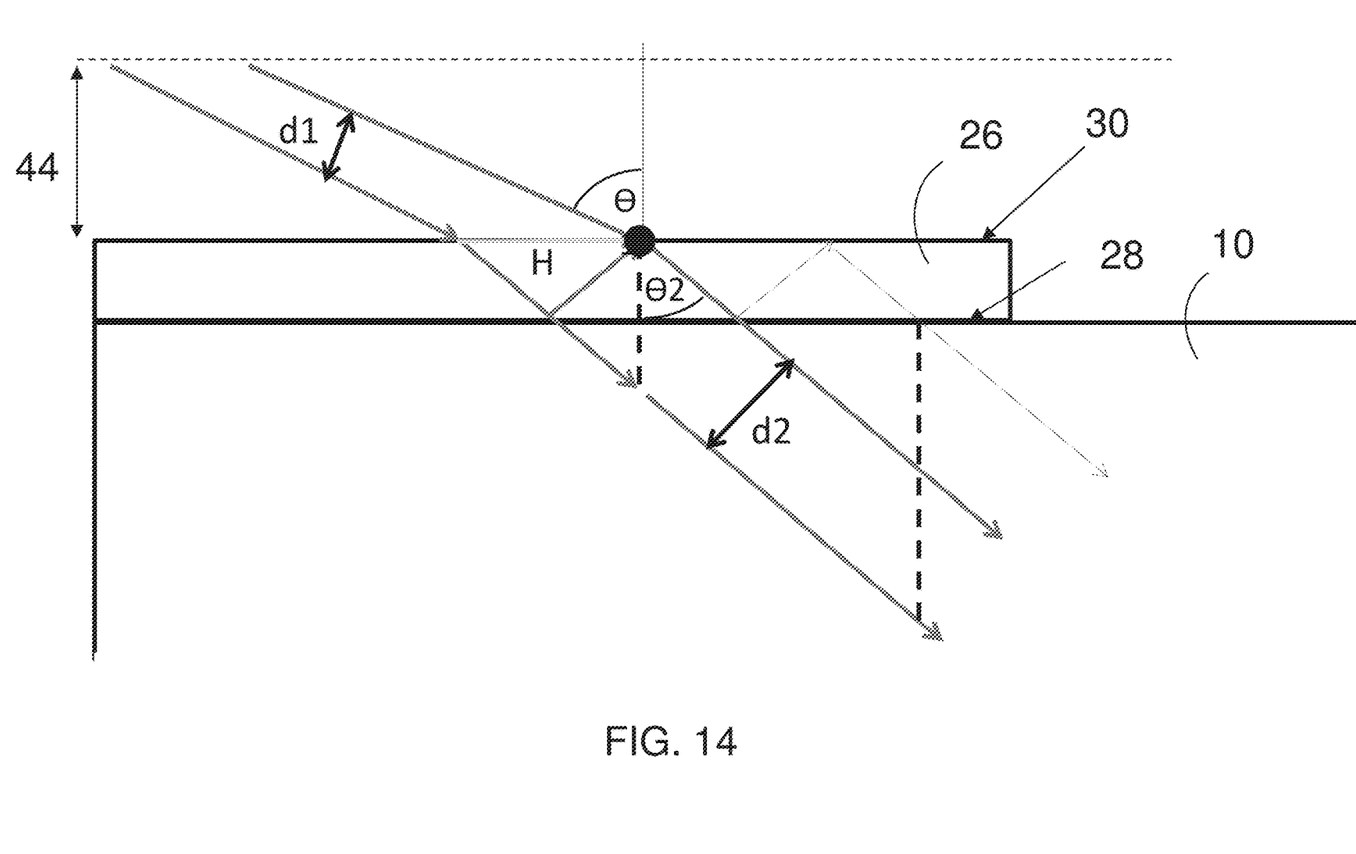
FIG. 14 is a schematic side view of an embodiment of the disclosed optical system using an air-gap coupling-in configuration.

FIG. 14 shows another optical system that performs beam multiplication in the non-guided dimension, according to an embodiment of the present invention. In contrast to the embodiments described with reference to FIGS. 10-12. In this embodiment, no wedge is used for coupling light rays into the LOE. Instead, the incoming beam (light rays) is injected into the LOE from the projector (not shown) via an air gap 44 (shown exaggerated for clarity). Similar to as described with reference to FIGS. 10-12, a transparent plate is deployed between the air gap 44 and LOE 10. The beam is expanded due in part to the transparent plate 26 (as previously described) and due in part to the refraction of the beam when moving from a lower refractive index air gap 44 medium to a higher refractive index medium (e.g., the LOE—which is typically constructed from glass). The expansion due to refraction is referred to as beam diameter magnification. As shown in FIG. 14, a beam having diameter $d_1$ impinges on the transparent plate covering a segment of length H at an angle of incidence of $\theta_1$ (measured relative to the normal). The refracted beam has a beam diameter of $d_2$ and angle of refraction of $\theta_2$ (measured relative to the normal). Using simple geometry, the following mathematical relationships can be easily derived:

$$H = \frac{d_1}{\cos \theta_1} \quad (1)$$

$$H = \frac{d_2}{\cos \theta_2} \quad (2)$$

$$d_2 = d_1 \left( \frac{\cos \theta_2}{\cos \theta_1} \right) \quad (3)$$

Since $\theta_2$ is less than $\theta_1$ (by Snell's law), $d_2$ is greater than $d_1$, thereby yielding a magnified beam diameter.

It should be emphasized that in the embodiments disclosed above with reference FIGS. 1A-1B and 4-14, light entering the propagation region of the LOE was previously reflected only by the partial reflectors and/or full reflector. In no case, should light reflected off an edge of the transparent plate (i.e. the edges of transparent plate 26 perpendicular to the LOE surfaces 12, 14) enter the propagation region of the LOE.

It will be appreciated that the display includes various additional components, typically including a controller for actuating the image projector, typically employing electrical power from a small onboard battery or some other suitable power source. It will be appreciated that the controller includes all necessary electronic components such as at least one processor or processing circuitry to drive the image projector, all as is known in the art. These features are not part of the invention per se, and therefore will not be described here in detail. All such features will be readily implemented by a person ordinarily skilled in the art.

In the description herein, the expanded beam is referred to as "fully illuminating" the propagation region in the sense that the beam multiplication configuration overcomes the limitations of the beam width provided by the image projector, and ensures that the entrance aperture to the LOE is provided with both the image and its conjugate over its entire area. Clearly, "full" illumination is assessed by the ability to generate a coupled-out image which does not have significant holes or black lines to an extent that would be perceived by, and troubling to, the eye of the observer. Minor imperfections in the filling of the LOE that do not significantly impact the user experience are clearly acceptable, and are encompassed by the phrase "fully illuminated."

It will be appreciated that the above descriptions are intended only to serve as examples, and that many other embodiments are possible within the scope of the present invention as defined in the appended claims.

What is claimed is:

1. An optical system for displaying an image to an eye of a user comprising:
   (a) a light-guide optical element (LOE) having two planar major external surfaces that are parallel so as to support propagation of image illumination with the LOE by internal reflection at the major external surfaces, the LOE having a thickness h between the major external surfaces, the LOE having a coupling-in region and a propagation region;
   (b) a coupling-out configuration associated with the propagation region of the LOE and configured for coupling out at least part of the image illumination from the LOE towards the eye of the user;
   (c) an image projector for generating image illumination corresponding to a collimated image, the image projector being optically coupled to the LOE so as to introduce the image illumination into the coupling-in region of the LOE so as to propagate within the propagation region of the LOE by internal reflection;
   (d) a beam-multiplication configuration associated with the LOE and configured for beam multiplication of the image illumination introduced into the coupling-in region of the LOE, the beam-multiplication configuration comprising m partially reflective mutually parallel surfaces, where m is a positive integer, the m surfaces being external to the LOE and parallel to the major external surfaces of the LOE, and further comprising a reflector, the m surfaces and reflector being arranged to reflect, into the propagation region, image illumination that was introduced into the coupling-in region so as to fully illuminate the propagation region with both the collimated image and a conjugate of the collimated image, wherein the m partially reflective surfaces extend along a length of the LOE adjacent to the coupling-in region.

2. The optical system of claim 1, wherein the m surfaces are provided by m transparent plates, each plate having a pair of major parallel external surfaces, the m plates bonded together at their respective major parallel surfaces to form a stack that is bonded to a major external surface of the LOE.

3. The optical system of claim 2, wherein the reflector is provided by an external surface of the $m^{th}$ plate, being the plate furthest from the LOE, said external surface being configured for full reflection via TIR.

4. The optical system of claim 2, wherein the reflector is provided by a mirror.

5. The optical system of claim 2, wherein each of the m plates has a thickness that is equal to $1/(m+1)$ of h.

6. The optical system of claim 2, wherein the 1st plate, being the plate that is closest to the LOE, extends along a length of the LOE only adjacent to the coupling-in region.

7. The optical system of claim 1, wherein the beam-multiplication configuration is configured to compensate for $1/(m+1)$ aperture filling.

8. The optical system of claim 1, wherein the LOE comprises a guided dimension and a non-guided dimension, and wherein the optical system comprises a first beam-multiplication configuration configured to provide beam multiplication in the guided dimension, and a second beam-multiplication configuration configured to provide beam multiplication in the non-guided dimension.

9. The optical system of claim 1, further comprising a coupling-in configuration associated with a coupling-in region of the LOE and configured for coupling in the image illumination from the image projector into the LOE so as to propagate within the LOE by internal reflection.

10. The optical system of claim 9, wherein the coupling-in configuration comprises a wedge prism positioned between the image projector and the coupling-in region of the LOE.

11. The optical system of claim 9, wherein the coupling-in configuration comprises a slanted edge at one end of the LOE between the image projector and the coupling-in region of the LOE.

12. The optical system of claim 1, wherein the coupling-out configuration comprises a plurality of mutually parallel facets angled obliquely to the major external surfaces of the LOE.

13. The optical system of claim 1, wherein the coupling-out configuration comprises a diffractive element.

14. An optical system for displaying an image to an eye of a user comprising:
   a) a light-guide optical element (LOE) having two planar major external surfaces that are parallel so as to support propagation of image illumination within the LOE by internal reflection at the major external surfaces, the LOE having a thickness h between the major external surfaces, the LOE having a coupling-in region and a propagation region;
   b) a coupling-out configuration associated with the propagation region of the LOE and configured for coupling out at least part of the image illumination from the LOE towards the eye of the user;
   c) an image projector for generating image illumination corresponding to a collimated image, the image projector being optically coupled to the LOE so as to introduce the image illumination into the coupling-in region of the LOE so as to propagate within the propagation region of the LOE by internal reflection; and
   d) a beam-multiplication configuration associated with the LOE and configured for beam multiplication of the image illumination introduced into the coupling-in region of the LOE, the beam-multiplication configuration comprising a transparent plate having mutually parallel external surfaces, the transparent plate bonded to a major external surface of the LOE adjacent to the coupling-in region, the transparent plate providing a partially-reflective surface between the LOE and the plate, and further providing a reflector, the partially-reflective surface and the reflector being arranged to reflect, into the propagation region, image illumination that was introduced into the coupling-in region so as to fully illuminate the propagation region with both the collimated image and a conjugate of the collimated image, wherein the transparent plate extends along a length of the LOE adjacent to the coupling-in region.

15. The optical system of claim 14, wherein the transparent plate has a thickness of h/2.

16. The optical system of claim 14, wherein the beam-multiplication configuration is configured to compensate for ½ aperture filling of the coupling-in region by the image projector.

17. The optical system of claim 14, further comprising a coupling-in configuration associated with a coupling-in region of the LOE and configured for coupling in the image illumination from the image projector into the LOE so as to propagate within the LOE by internal reflection.

18. The optical system of claim 14, wherein the coupling-in configuration comprises a wedge prism positioned between the image projector and the coupling-in region of the LOE.

19. The optical system of claim 14, wherein the coupling-in configuration comprises a slanted edge at one end of the LOE between the image projector and the coupling-in region of the LOE.

20. The optical system of claim 14, wherein the LOE comprises a guided dimension and a non-guided dimension, and wherein the optical system comprises a first beam-multiplication configuration configured to provide beam multiplication in the guided dimension, and a second beam-multiplication configuration configured to provide beam multiplication in the non-guided dimension.

* * * * *